(Model.)
R. R. EARNEST.
DRAG SAW.
No. 256,469. Patented Apr. 18, 1882.
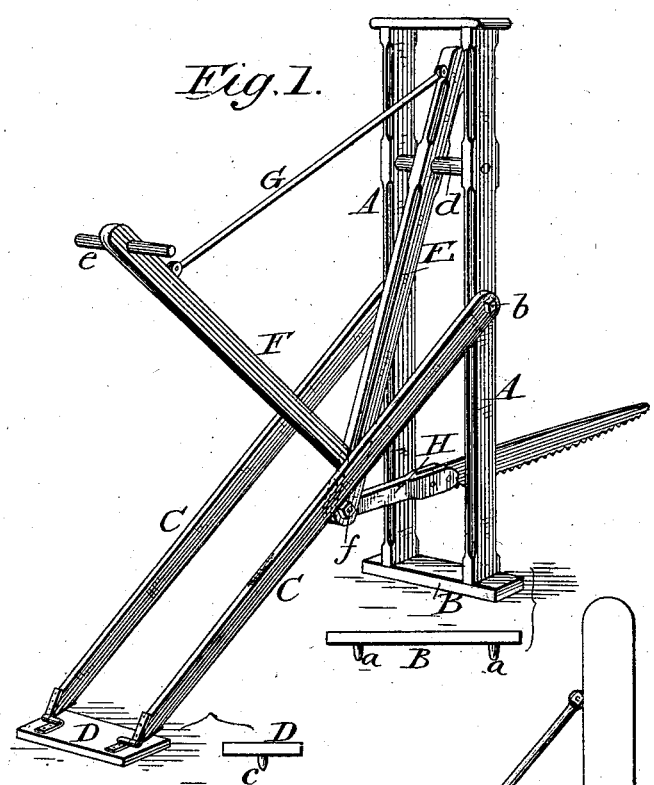
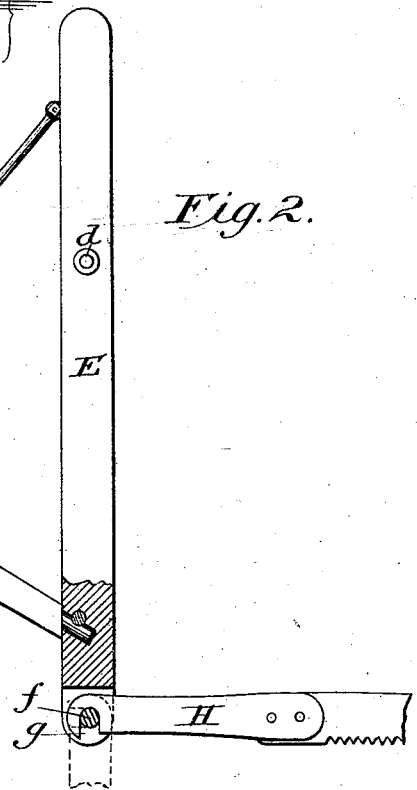
WITNESSES
Sidney P. Hollingsworth
Walter S. Dodge
INVENTOR
Robert R. Earnest,
by Dodge Son,
Attys.
N. PETERS, Photo-Lithographer, Washington, D. C.

UNITED STATES PATENT OFFICE.

ROBERT R. EARNEST, OF MECHANICSBURG, OHIO, ASSIGNOR OF ONE-HALF TO WILLIAM P. MURRAY, OF SAME PLACE.

DRAG-SAW.

SPECIFICATION forming part of Letters Patent No. 256,469, dated April 18, 1882.

Application filed January 9, 1882. (Model.)

*To all whom it may concern:*

Be it known that I, ROBERT R. EARNEST, of Mechanicsburg, in the county of Champaign and State of Ohio, have invented certain Improvements in Drag-Saws, of which the following is a specification.

My invention relates to drag-saws; and it consists in a novel construction of the frame, whereby it may be folded into a small compass for storage or shipment; in providing the braces with a foot-board, upon which the operator stands, thus steadying the frame; in a peculiar manner of attaching the saw, and in other details hereinafter explained.

In the accompanying drawings, Figure 1 represents a perspective view of my improved apparatus; Fig. 2, an enlarged view, showing certain details.

The primary object of my invention is to furnish a cheap and simple sawing apparatus suitable for the uses of farmers and others, which may be conveniently transported from place to place, packed in small space, and easily operated. To this end I construct my improved machine as shown in the drawings, in which—

A represents an upright frame, provided with a sill, B, which latter is furnished on its under side with points or projections $a$ to enter the ground and retain the frame in place. The frame A is braced and steadied by pivoted braces C, which are attached to the uprights by bolts $b$, upon which they may be swung to any desired position. The lower ends of the braces C are firmly attached to a foot-board or platform, D, furnished, like the sill B, with points $c$ to enter the ground and prevent the slipping of the foot-board.

In actuating the saw the operator stands upon the foot-board or platform D, thus holding it firmly to the ground, and the braces being firmly attached to the foot-boards and connected with the upright frame A, it will be seen that the latter will be securely held against movement either forward or backward.

The foot-board D may be pivoted or jointed to the braces to permit it to adapt itself readily to the ground upon which it stands and under varying inclinations of the braces.

E represents a pendulous bar or lever, carried by a shaft, $d$, passing transversely through it near its upper end and journaled in the uprights of the frame A, or passing loosely through the lever E, as may be found expedient. The lever E is furnished with an operating arm or bar, F, extending upward at an angle from near the lower end of lever E, furnished at its outer extremity with a cross rod or handle, $e$, and braced by a rod, G, extending from the upper end of lever or bar E to near the outer end of the operating arm or bar F.

In practice I prefer to joint the rod G to the lever E and bar F, and to joint the arm F or make it detachable at its lower end, in order that they may be folded closely together. The lever or bar E is slotted at its lower end and provided with a transverse bolt, $f$, as shown in Fig. 2, and the arm or pitman H is formed with a hooked or notched end, $g$, the hook being so formed and the bolt so located with reference to the top of the slot that the hook can only be detached by swinging the saw to the position indicated by dotted lines in Fig. 2—a position which it cannot assume while in operation. In other words, the depth of the notch must slightly exceed the space or distance from the upper side of the pitman to the top of the slot in lever F, as shown. The end of the pitman will be preferably rounded, as represented in the drawings. It will therefore be observed that although the saw cannot become accidentally detached while in use, it may be removed quickly without withdrawing the bolt $f$, and as quickly replaced.

I am aware that a pendulous lever or arm provided with an operating-handle has before been used, and that it is not broadly new to connect the saw to the lever by a hook-shaped connection capable of being detached without withdrawing the bolt; but I am not aware that any one has ever before constructed the operating-lever and its brace as herein described, whereby I am enabled to fold the parts compactly together; nor am I aware that any one has before constructed a hook-shaped fastening for the saw that could not become accidentally detached while the saw was in use.

I am also aware that a saw-frame has been jointed to permit it to be folded, and I make no claim broadly thereto.

I believe myself, however, to be the first to provide such folding frame with a foot-board such as shown and described, by which the frame is rendered steady and firm, and a convenient platform is furnished for the operator to stand upon.

Having thus described my invention, what I claim is—

1. The saw-frame consisting of the upright frame A, having sill B, and the braces C, pivoted to the frame A and provided with foot-board D, whereby the operator is afforded a convenient standing-place and enabled to hold the braces by his weight in any position to which they may be adjusted.

2. A drag-sawing machine consisting of the frame A, pivoted braces C, having foot-board D, pendulous lever E, provided with a jointed operating-lever, and saw I, connected with lever E, as explained, whereby the machine is adapted to be folded into a compact form for storage or shipment, as set forth.

3. In a drag-sawing mechanism, the combination of a moving arm or lever, E, slotted and furnished with a transverse bolt, and a saw-carrying pitman, H, having a notch of a depth exceeding the space between the pitman and the end of the slot, whereby the detachment of the pitman when in its operative position is prevented.

ROBERT R. EARNEST.

Witnesses:
  OSCAR S. CHENEY,
  THEODRICK S. CHENEY.